US011847434B2

(12) United States Patent
Kielstra et al.

(10) Patent No.: US 11,847,434 B2
(45) Date of Patent: Dec. 19, 2023

(54) FAST SEARCH FOR SEARCH STRING INSTRUCTIONS

(71) Applicant: International Business Machines Corporation, Armonk, NY (US)

(72) Inventors: Allan H. Kielstra, Ajax (CA); Ying Chau Raymond Mak, Thornhill (CA); Ka Yin Lam, Markham (CA); John Michael Chase, Keswick (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/356,584

(22) Filed: Jun. 24, 2021

(65) Prior Publication Data

US 2022/0413817 A1  Dec. 29, 2022

(51) Int. Cl.
  *G06F 8/41*  (2018.01)
  *G06F 16/903*  (2019.01)
(52) U.S. Cl.
  CPC ........ *G06F 8/443* (2013.01); *G06F 16/90344* (2019.01)
(58) Field of Classification Search
  CPC ........................... G06F 8/443; G06F 16/90344
  USPC ....................................................... 717/151
  See application file for complete search history.

(56) References Cited

U.S. PATENT DOCUMENTS

| 8,397,285 | B2 | 3/2013 | Balakrishnan |
| 8,819,045 | B2 | 8/2014 | Dhulipala |
| 2008/0040345 | A1* | 2/2008 | Cameron ........... G06F 16/90344 |
| 2012/0233185 | A1* | 9/2012 | Najjar et al. ...... G06F 16/90344 707/752 |
| 2012/0254210 | A1* | 10/2012 | Dhulipala et al. .......... G06F 16/90344 707/758 |
| 2014/0032513 | A1* | 1/2014 | Gaither ............. G06F 16/90344 707/698 |

OTHER PUBLICATIONS

Al-Dabbagh et al., "Fast Hybrid String Matching Algorithm based on the Quick-Skip and Tuned Boyer-Moore Algorithms," (IJACSA) International Journal of Advanced Computer Science and Applications, vol. 8, No. 6, 2017, 11 pages.

(Continued)

*Primary Examiner* — Wei Y Zhen
*Assistant Examiner* — Mohammed N Huda
(74) *Attorney, Agent, or Firm* — Randy Tejeda (57) ABSTRACT

One or more computer processors receive a pattern string comprising a pointer to a pattern search point and a string comprising a pointer to a search point; determine a plausible search point within the string for the pattern character; execute a search string (SRST) instruction with the determined search point and the pattern character; compute a pattern offset comprising a difference between a first occurrence of the determined pattern character located within the pattern string but not in the correct position and a current pattern character position; execute a subsequent SRST instruction with the current pattern character position and the computed offset set as a new search point; and responsive to identifying all pattern characters in the correct position within the string based on the executed subsequent SRST instruction, transmit memory address associated with a substring comprised of the string and corresponding pattern characters in the correct position.

14 Claims, 7 Drawing Sheets

(56) References Cited

OTHER PUBLICATIONS

Sunday, Daniel M., "A Very Fast Substring Search Algorithm," Communications of the ACM, Aug. 1990, 11 pages.

* cited by examiner

```
char * findStr(char *Ts, char *Tep1, char *Ps, int Pl) {
  if (Pl == 1) return SRST(Ts, Tep1, Ps[0]);
  nxtStartPoint = 0;
  loop:
     Ts = SRST(Ts, Tep1, Ps[0]);
     if (Ts == NULL) return NULL;
     if (Tep1 - Ts < pl) return NULL;
     if (nxtStartPoint == Pl - 1) {
        nxtStartPoint = 1;
     } else {
        ++nxtStartPoint;
     }
     i = nxtStartPoint;
     do {
        Ttmp = Ts + i;
        Tpos = SRST(Ttmp, Tep1, Ps[i]);
        if (TPos == NULL) return NULL;
        if (Tpos != Ttmp) {
           firstInPattern = SRST(Ps, Ps+i+1, Ps[i]);
           offset = firstInPattern - Ps;
           Ts = Tpos - offset;
           goto loop;
        }
        if (i == Pl - 1) {
           i = 1;
        } else {
           ++i;
        }
     } while (i != nxtStartPoint);
  return Ts;}
```

FIG. 3

```
typedef struct Pattern_Stat_T {                              /* 400 */
  unsigned int  mismatch_count;
  unsigned int  mismatch_offset;
  unsigned int mismatch_offset_avg;
  unsigned int char_position;
} Pattern_Stat_T;

Pattern_Stat_T   pat_char_tab [MAX];

char * findStr_w_data_gathering(char *Ts, char *Tep1, char *Ps, int Pl){
  if (Pl == 1) return SRST(Ts, Tep1, Ps[0]);
  nxtStartPoint = 0;
  loop:
    Ts = SRST(Ts, Tep1, Ps[0]);
    if (Ts == NULL) return NULL;
    if (Tep1 - Ts < pl) return NULL;
    if (nxtStartPoint == Pl - 1) {
      nxtStartPoint = 1;
    } else {
      ++nxtStartPoint;
    }
    i = nxtStartPoint;
    do {
      Ttmp = Ts + i;
      Tpos = SRST(Ttmp, Tep1, Ps[i]);
      if (TPos == NULL) return NULL;
      if (Tpos != Ttmp) {
        pat_char_tab [ i ].mismatch_count += 1;
        pat_char_tab [ i ].mismatch_offset += Tpos - Ttmp;
        firstInPattern = SRST(Ps, Ps+i+1, Ps[i]);
        offset = firstInPattern - Ps;
        Ts = Tpos - offset;
        goto loop;
      }
      if (i == Pl - 1) {
        i = 1;
      } else {
        ++i;
      }
    } while (i != nxtStartPoint);
  return Ts}
```

FIG. 4

```
typedef struct Pattern_Stat_T {
  unsigned int mismatch_count;
  unsigned int mismatch_offset;
  unsigned int mismatch_offset_avg;
  unsigned int char_position;
} Pattern_Stat_T;

Pattern_Stat_T pat_char_tab [MAX];

for each char position k in pattern {
  pat_char_tab [ k ].mismatch_offset_avg = pat_char_tab [ k ].mismatch_offset / pat_char_tab [ k ].mismatch_count;
  pat_char_tab [ k ].char_position = k;
} char * findStr_w_data_gathering(char *Ts, char *Tep1, char *Ps, int Pl){
  if (Pl == 1) return SRST(Ts, Tep1, Ps[0]);
  loop:
    Ts = SRST(Ts, Tep1, Ps[0]);
    if (Ts == NULL) return NULL;
    if (Tep1 - Ts < pl) return NULL;
    k = 0;
    do {
      i = pat_char_tab [ k ].char_position;
      Ttmp = Ts + i;
      Tpos = SRST(Ttmp, Tep1, Ps[i]);
      if (TPos == NULL) return NULL;
      if (Tpos != Ttmp) {
        firstInPattern = SRST(Ps, Ps+i+1, Ps[i]);
        offset = firstInPattern - Ps;
        Ts = Tpos - offset;
        goto loop;
      }
      ++k;
    } while (k != Pl – 1);
  return Ts}
```

FIG. 5

|  | BRUTE FORCE STRING SEARCH | STRING SEARCHING USING SRST | PROGRAM 150 |
|---|---|---|---|
| DATA A | 22.25 | 1.63 | 1.54 |
| DATA B | 22.72 | 17.95 | 2.10 |

FAST SEARCH FOR SEARCH STRING INSTRUCTIONS

BACKGROUND

The present invention relates generally to the field of computer programming, and more particularly to search string (SRST) optimization.

In computer programming, machine code, consisting of machine language instructions, is a low-level programming language used to directly control a computer's central processing unit (CPU). Each instruction causes the CPU to perform a very specific task, such as a load, a store, a jump, or an arithmetic logic unit (ALU) operation on one or more units of data in the CPU's registers or memory. Machine code is a strictly numerical language which is intended to run as fast as possible, and it may be regarded as the lowest-level representation of a compiled or assembled computer program or as a primitive and hardware-dependent programming language. Every processor or processor family has its own instruction set. Instructions are patterns of bits, digits or characters that correspond to machine commands. Thus, the instruction set is specific to a class of processors using (mostly) the same architecture.

SUMMARY

Embodiments of the present invention disclose a computer-implemented method, a computer program product, and a system. The computer-implemented method includes one or more computer processors receiving a pattern string comprising a pointer to a pattern search point and a string comprising a pointer to a search point, wherein the search point references a character and the pattern search point references a pattern character utilizing an executed search string (SRST) instruction. The one or more computer processors determine a plausible search point within the string for the pattern character; execute the SRST instruction with the determined search point and the pattern character, wherein the SRST instruction returns an indication of whether the character corresponds to the pattern character. The one or more computer processors responsive to determining that the pattern character is located within the string but not in a correct position as required by the pattern string based on the executed SRST instruction, compute a pattern offset comprising a difference between a first occurrence of the determined pattern character located within the pattern string but not in the correct position and a current pattern character position. The one or more computer processors execute a subsequent SRST instruction with the current pattern character position and the computed offset set as a new search point. The one or more computer processors responsive to identifying all pattern characters in the correct position within the string based on the executed subsequent SRST instruction, transmit memory address associated with a substring comprised of the string and corresponding pattern characters in the correct position.

DETAILED DESCRIPTION

Currently, many organizations and associated enterprise systems process many text records, looking for a particular string or substring (e.g., sequence of characters) present in each text record. Traditionally, said enterprise systems utilize brute force looping methods that are computationally wasteful and are unable to conform to particular sequences of pattern strings and goal strings. Moreover, enterprise systems that solely utilize SRST to perform said analysis, perform poorly with text strings that contain repeated occurrences of the first character of the pattern string substantially increasing required computational overhead as evidenced in FIG. 6. Embodiments of the present invention improve enterprise systems that process significant quantities of text records or strings by optimizing the basic SRST instruction by generating or providing three variants describe below. Embodiments of the present invention reduce computational resources utilized by reducing the duration needed to effectively search within one or more strings. Embodiments of the present invention recognize that string searches are improved by dynamically moving the text search point or text string index (Ts) to the largest index point in the text string when said systems fail to match a pattern from a plausible starting point. Embodiments of the present invention recognize that substring searches are improved through variants that gather and exploit data associated with a specific call of program 150 or SRST. Embodiments of the present invention improve substring searches through utilizing a data gather variant that visits characters in the pattern in a round-robin fashion, where each time that present invention fails to match a pattern from a plausible text search point, the embodiments of present invention records information associated with the pattern character position. Additionally, the embodiments of the present invention increment Ts based on the number of times that the character in a specific position has caused a search failure. Further, embodiments of the present invention increment a data store containing a total distance that a Ts point was incremented as a result of one or more failures to match. Embodiments of the present invention recognize that string searches are improved by, responsive to multiple calls of the standard variant, computing a fixed order for visiting characters contained in the pattern string. Implementation of embodiments of the invention may take a variety of forms, and exemplary implementation details are discussed subsequently with reference to the Figures.

The present invention will now be described in detail with reference to the Figures.

Figure 1:
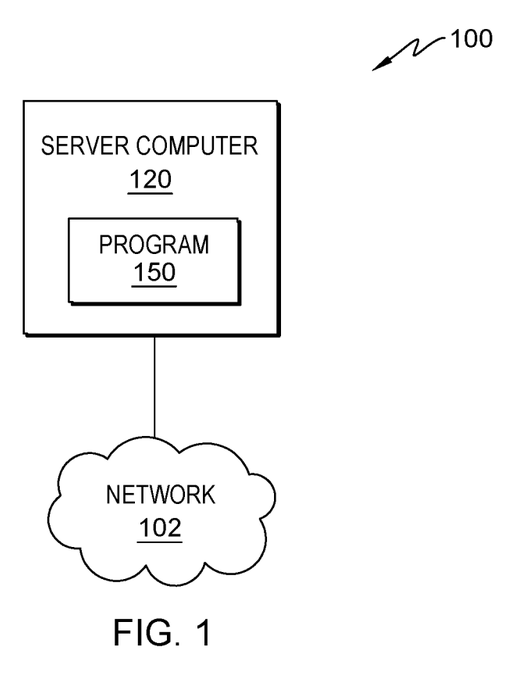
FIG. 1 (i.e., FIG.) is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. The term "distributed" as used in this specification describes a computer system that includes multiple, physically, distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes server computer 120 connected to network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks that are capable of receiving and transmitting data, voice, and/or video signals, including multimedia signals that include voice, data, and video information. In general, network 102 can be any combination of connections and protocols that will support communications between server computer 120 and other server computers (not shown) within distributed data processing environment 100. In various embodiments, network 102 operates locally via wired, wireless, or optical connections and can be any combination of connections and protocols (e.g., personal area network (PAN), near field communication (NFC), laser, infrared, ultrasonic, etc.).

Server computer 120 can be a standalone computing device, a management server, a web server, a mobile computing device, or any other electronic device or computing system capable of receiving, sending, and processing data. In other embodiments, server computer 120 can represent a server computing system utilizing multiple computers as a server system, such as in a cloud computing environment. In another embodiment, server computer 120 can be a laptop computer, a tablet computer, a netbook computer, a personal computer (PC), a desktop computer, a personal digital assistant (PDA), a smart phone, or any programmable electronic device capable of communicating with other server computers (not shown) within distributed data processing environment 100 via network 102. In another embodiment, server computer 120 represents a computing system utilizing clustered computers and components (e.g., database server computers, application server computers, etc.) that act as a single pool of seamless resources when accessed within distributed data processing environment 100. In the depicted embodiment, server computer 120 includes program 150. In other embodiments, server computer 120 may contain other applications, databases, programs, etc. which have not been depicted in distributed data processing environment 100. Server computer 120 may include internal and external hardware components, as depicted and described in further detail with respect to FIG. 7.

Program 150 is a program for search string optimization. In various embodiments, program 150 may implement the following steps: receive a pattern string comprising a pointer to a pattern search point and a string comprising a pointer to a search point, wherein the search point references a character and the pattern search point references a pattern character; determine a plausible search point within the string for the pattern character utilizing an executed search string (SRST) instruction; execute the SRST instruction with the determined search point and the pattern character, wherein the SRST instruction returns an indication of whether the character corresponds to the pattern character; responsive to determining that the pattern character is located within the string but not in a correct position as required by the pattern string based on the executed SRST instruction, compute a pattern offset comprising a difference between a first occurrence of the determined pattern character located within the pattern string but not in the correct position and a current pattern character position; execute a subsequent SRST instruction with the current pattern character position and the computed offset set as a new search point; and responsive to identifying all pattern characters in the correct position within the string based on the executed subsequent SRST instruction, transmit memory address associated with a substring comprised of the string and corresponding pattern characters in the correct position. In the depicted embodiment, program 150 is a standalone software program. In another embodiment, the functionality of program 150, or any combination programs thereof, may be integrated into a single software program. In some embodiments, program 150 may be located on separate computing devices (not depicted) but can still communicate over network 102. In various embodiments, client versions of program 150 resides on any other computing device (not depicted) or server computer within distributed data processing environment 100. Program 150 is depicted and described in further detail with respect to FIG. 2.

The present invention may contain various accessible data sources that may include personal storage devices, data, content, or information the user wishes not to be processed. Processing refers to any, automated or unautomated, operation or set of operations such as collection, recording, organization, structuring, storage, adaptation, alteration, retrieval, consultation, use, disclosure by transmission, dissemination, or otherwise making available, combination, restriction, erasure, or destruction performed on personal data. Program 150 provides informed consent, with notice of the collection of personal data, allowing the user to opt in or opt out of processing personal data. Consent can take several forms. Opt-in consent can impose on the user to take an affirmative action before the personal data is processed. Alternatively, opt-out consent can impose on the user to take an affirmative action to prevent the processing of personal data before the data is processed. Program 150 enables the authorized and secure processing of user information, such as tracking information, as well as personal data, such as personally identifying information or sensitive personal information. Program 150 provides information regarding the personal data and the nature (e.g., type, scope, purpose, duration, etc.) of the processing. Program 150 provides the user with copies of stored personal data. Program 150 allows the correction or completion of incorrect or incomplete personal data. Program 150 allows the immediate deletion of personal data.

Figure 2:
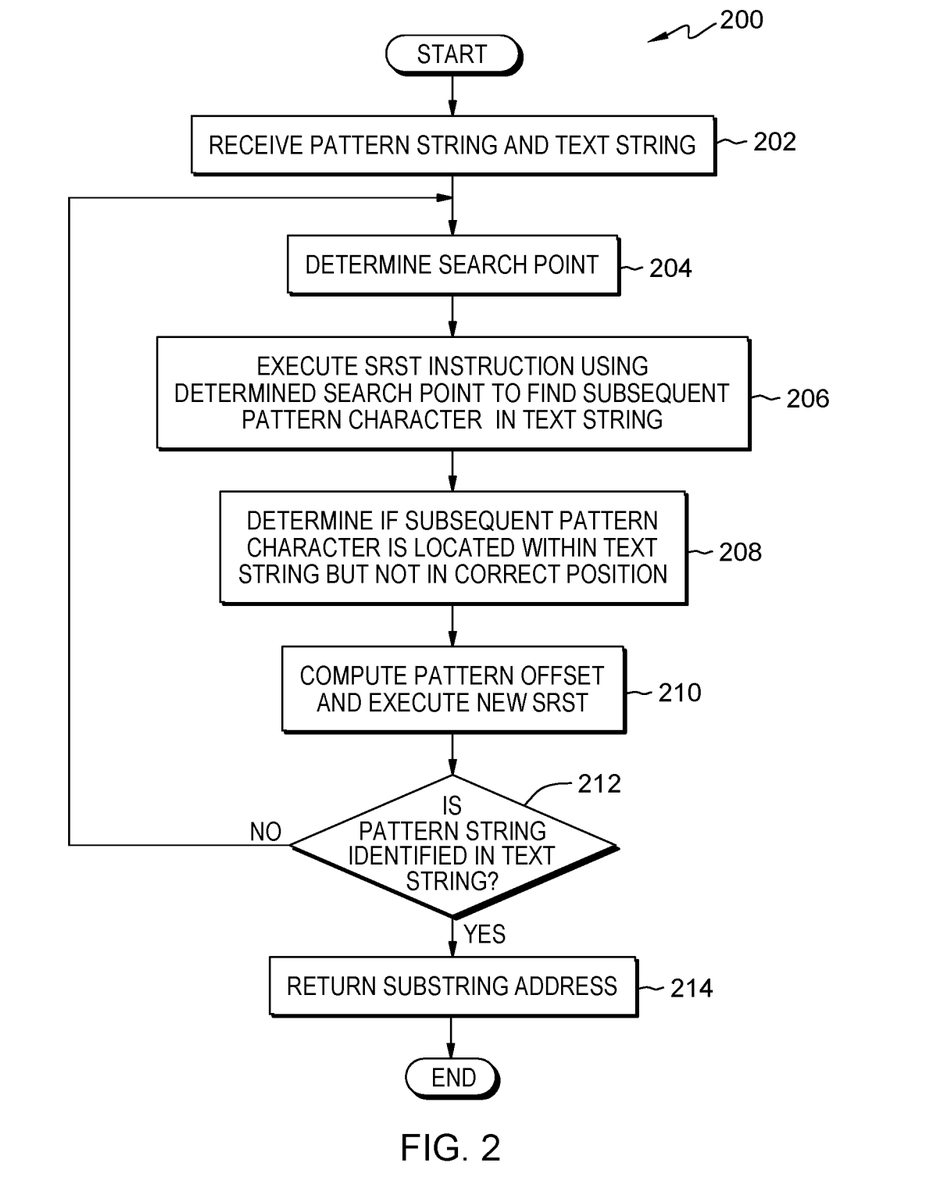
FIG. 2 is a flowchart depicting operational steps of a program, on a server computer within the data processing environment of FIG. 1, for search string (SRST) optimization, in accordance with an embodiment of the present invention.

FIG. 2 depicts flowchart 200 illustrating operational steps of program 150 for search string optimization, in accordance with an embodiment of the present invention.

Program 150 receives a pattern string and a text string (step 202). In an embodiment, program 150 initiates responsive to a transmitted string or a request for a SRST instruction, with an associated pattern string, where the transmitted string and the pattern string comprise a sequence of indexed characters (e.g., symbols, substrings, letters, words, numbers, etc.) in memory. In the proceeding embodiments, program 150 utilizes the following SRST(Ts, Tep1, c) instruction to search for a pattern character (i.e., c) contained within a pattern string (i.e., Ps) in a text string, initially, starting at address Ts (e.g., text search point, reference to text character or text substring, etc.) and ending at address (i.e., Tep1) plus one, returning the address of the first instance of c or a NULL if no instances are identified. In another embodiment, SRST returns any distinct value representing said address or character. In an embodiment, SRST returns an indication of whether a text string character corresponds to the pattern character. In another embodiment, program 150 initiates responsive to a call to a controlled function (i.e., findStr(char *Ts, char *Tep1, char *Ps, int Pl)), providing the controlled function one or more text strings (e.g., a pointer to the start and end of a sequence of characters), a pattern string (e.g., a pointer to a pattern character in the pattern string (i.e., Ps[i] or pattern search point)), and a length of the pattern string (i.e., Pl). In an embodiment, program 150 manipulates Ts and Ps to examine areas, substrings, or regions of the pattern string and text strings for character matches.

Program 150 determines search point (step 204). In an embodiment, program 150 determines or identifies a plausible text search point or position within the text string to initiate a string or character search (i.e., determine if subsequent characters contained in the text string are present in the pattern string). In an embodiment, the initial text search point is the first character in a multi-character text string. In another embodiment, program 150 executes a first SRST instruction to find a first character c of the pattern string starting at Ts and ending at Tep1. Responsive to a pattern string of length one (i.e., a single character string), program 150 returns SRST(Ts, Tep1, Ps[0]). In an embodiment, program 150 initially progresses or increments Ts in order to encounter or match the first occurrence of the first character in the pattern string to a character within the text string. Responsively, program 150 assigns a text temp (TTMP) variable to the newly incremented Ts prior to of the next SRST instruction. In a further embodiment, program 150 adjusts Ts in order to focus on other regions (i.e., characters and substrings) within the text string.

Program 150 executes the next SRST instruction using the determined text search point to find a subsequent pattern character in text string (step 206). In the aforementioned embodiments, program 150 checks (e.g., matches) each character in the pattern string at each character position. In an embodiment, program 150 rotates the order of character visitation such that a least once every Pl–1, program 150 identifies a least common character matched from the text string to the pattern string. This embodiment avoids prolonged searches through text strings with frequently occurring pattern string prefixes but with no or few occurrences of the entire pattern string. For example, the first time the search loop is initiated, program 150 visits pattern characters in the following position order: 1, 2, . . . , Pl–1; second iteration: 2, 3, . . . , Pl–1, 1; third iteration: 3, 4, . . . , Pl–1, 1, 2; etc.

Program 150 determines if the subsequent pattern character is located within text string but not in a current position (step 208). Responsive to program 150 encountering a character at position Ps[i] in the text string but not in the correct position as required by the pattern string, program 150 establishes a new search utilizing an adjusted Tpos value (i.e., current position or position of last pattern character identified in the text string). Here, program 150 identifies the first occurrence of the Ps[i] character in the pattern string and sets the new text search point (i.e., Ts) to this value. For example, in the situation with a pattern string containing the characters "Sarah", program 150 encounters the substring "Sar" within the text string, but the subsequent required pattern character "a" is identified later (i.e., at a position higher than the current character position within the string) in the text string. Responsive to program 150 identifying a matching character later in the text string, program 150 sets Ts such that the later identified character is the first character match in a subsequent search. For example, program 150 sets the Ts such that the identified "a" would be the first "a" in the pattern string in the subsequent search.

Program 150 computes a pattern offset and executes a new SRST (step 210). Responsive to step 210, program 150 computes a pattern offset comprising the distance between the first occurrence of a character in the pattern string and the current position in the pattern string (i.e., Ps[i]). Responsively, program 150 sets Ts to the difference of the current text string position and the computed pattern offset. This method allows program 150 the possibility of encountering the correct character substring (i.e., pattern string) while moving Ts to the largest probable search point as possible. In a further embodiment, program 150 sets Ts to the computed offset and executes a new SRST utilizing the updated parameters. In an embodiment, program 150 loops responsive to program 150 failing to find a match from a plausible search position, each time adjusting the search position (i.e., Ts).

If the pattern string is identified in the text string ("yes" branch, decision block 212), then program 150 returns a substring address (step 214). Program 150 determines if all characters within a pattern string are present within one or more text strings or text string regions when program 150 reaches the end of the pattern string indicating that all characters within the pattern string have been found within the text string. For example, program 150 utilizes SRST to find each character in the pattern string in the correct order, thus identifying the pattern string within the text string. Responsively, program 150 returns or transmits one or more memory addresses corresponding to one or more substrings (i.e., patterns) occurrences in one or more text strings. In an example, program 150, responsively, initiates TF-IDF (term frequency-inverse document frequency) calculations and dynamically adjusts pattern weights proportionally to the number of times a pattern string appears in one or more text strings and offsetting by the number of text strings that contain the pattern. In a further example, the TF-IDF calculations are utilized in subsequent machine learning operations.

If the pattern string is not identified in the text string ("yes" branch, decision block 212), then program 150 determines a search point (step 204). Here, program 150 determines that the pattern string is not present in a substring, scope, or region (i.e., search point). In an embodiment, program 150 continues to loop and increment Ts and determines a new text search point for a newly assigned TTMP, as described in step 204, FIGS. 3, 4, and 5. In an embodiment, program 150 notifies or transmits a notification of a failure of search for a pattern character, sequence of pattern characters, or the entire pattern string. For example, program 150 notifies an administrator or user of the failure of search through a returned NULL value.

Figure 3:
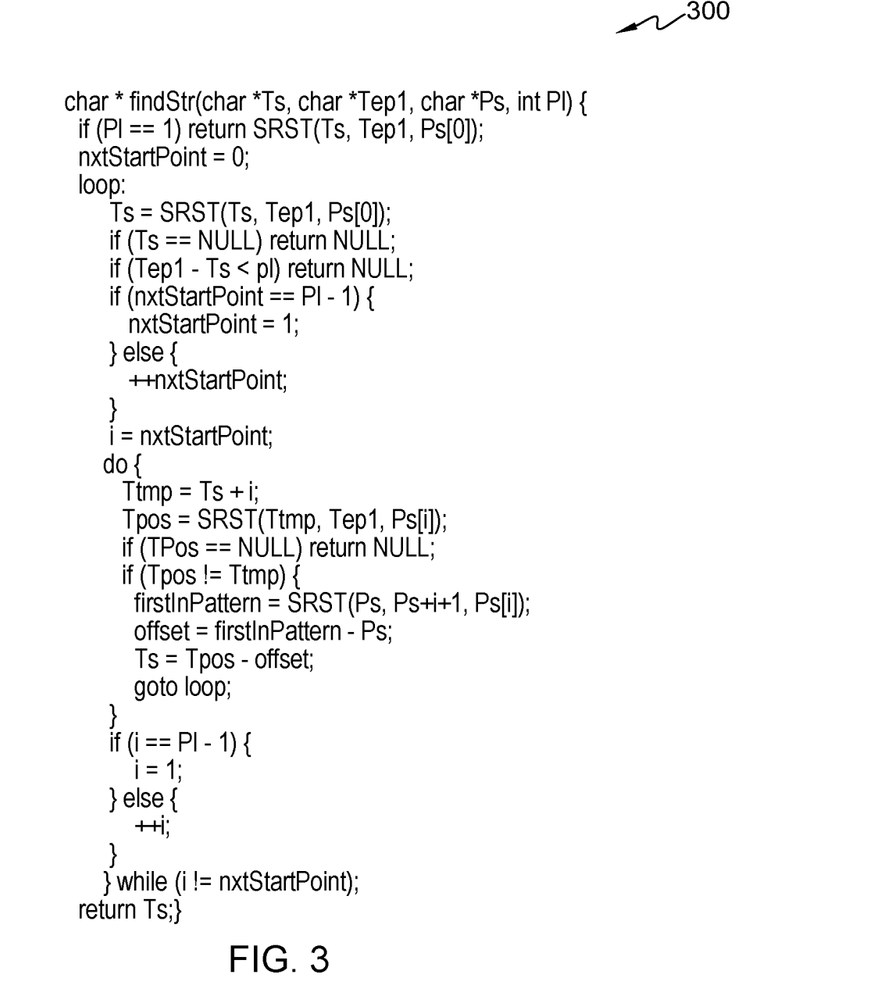
FIG. 3 illustrates operational steps of the program within the data processing environment of FIG. 1, in accordance with an embodiment of the present invention.

FIG. 3 depicts algorithm 300, in accordance with an illustrative embodiment of the present invention. In an embodiment, algorithm 300 is written in a C-like pseudo-code but any programmatic language can be utilized (e.g., assembler, etc.). Algorithm 300 illustrates the operational steps described within FIG. 2 and through steps 202-214.

Figure 4:
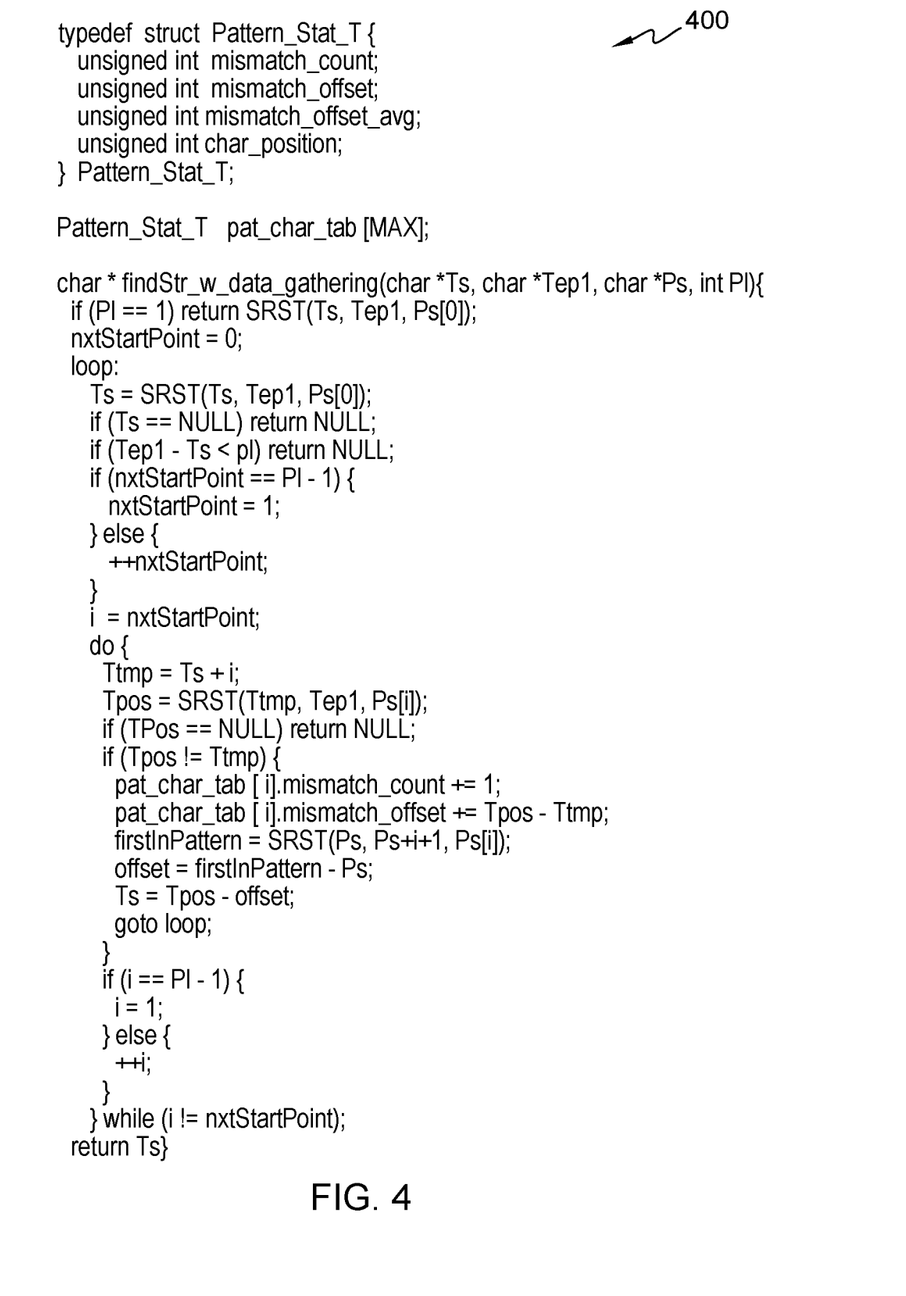
FIG. 4 illustrates operational variant of the steps of the program within the data processing environment of FIG. 1, in accordance with an embodiment of the present invention.

FIG. 4 depicts algorithm 400, in accordance with an illustrative embodiment of the present invention. In an embodiment, algorithm 400 is written in a C-like pseudo-code but any programmatic language can be utilized (e.g., assembler, etc.). Algorithm 400 illustrates an extension (e.g., variant) of program 150 utilizing additional data gathering. Algorithm 400 contains a data structure represented by typedef struct Pattern_Stat_T and utilized to create a table representing each pattern character and/or position associated with the pattern string. In an embodiment, program 150 is called as search routine from one or more call sites (i.e., location where the function is called) and program 150 maintains a table (i.e., pat_char_tab), where the table is comprised with a plurality of entries, each entry corresponds to a distinct pattern character or position. In another embodiment, program 150 maintains a separate table for each call site. In an embodiment, as program 150 progresses through a plurality of search calls, requests, and search iterations associated with one or more pattern strings, program 150, concurrently, records (e.g., gathers) search data, where the search data includes a number of mismatches encountered by a specific pattern character or position; an offset value calculated from the expected position of a pattern character identified in the text string at position Ts, average mismatch offset; and a corresponding pattern character position in the pattern string.

Figure 5:
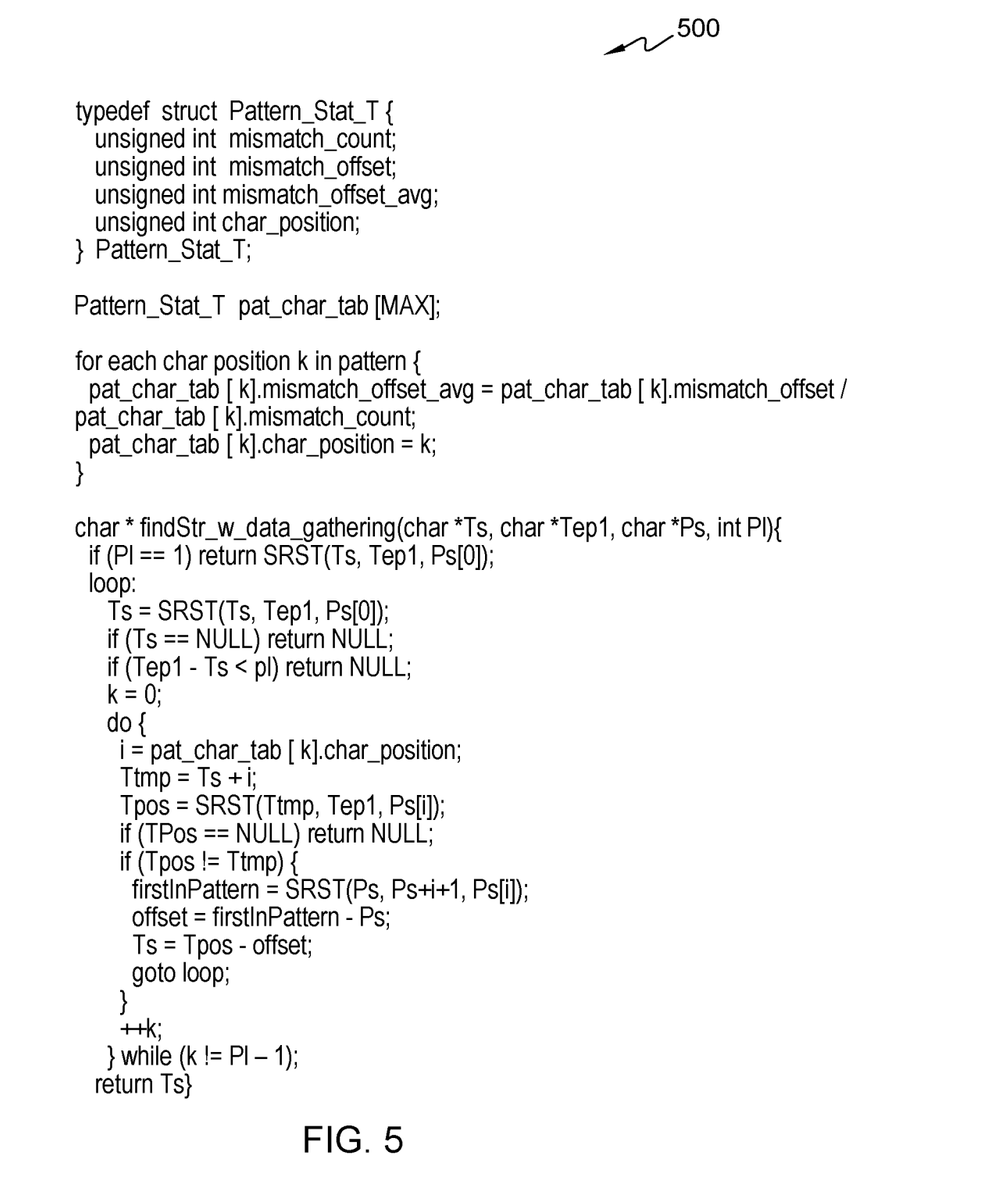
FIG. 5 illustrates operational variant of the steps of the program within the data processing environment of FIG. 1, in accordance with an embodiment of the present invention.

FIG. 5 depicts algorithm 500, in accordance with an illustrative embodiment of the present invention. In an embodiment, algorithm 500 is written in a C-like pseudo-code but any programmatic language can be utilized (e.g., assembler, etc.). Algorithm 500 illustrates an extension (e.g., variant) of program 150 and algorithm 400; adding data exploitation functionality. Program 150 utilizes algorithm 500 to compute the average mismatch offset for each entry within an associated pat_char_tab table, where each computed average mismatch offset is associated with a specific character in a pattern string. Program 150 utilizes an average mismatch offset to assign the next Ts position (i.e., specific character within the pattern string). In an embodiment, program 150 utilizes the average mismatch offset as an error value for a specific pattern character.

In an embodiment, program 150 maximizes Ts by sorting pat_char_tab in descending order of average mismatch offset thus producing an optimal visiting order of the positions (i.e., characters) in a pattern string. Responsively, program 150 utilizes the sorted pat_char_tab to determine the character position visiting order as shown by i=pat_char_tab[k].char_position in Algorithm 500. Additionally, subsequent calls are analyzed by this data exploitation embodiment of the present invention that identifies visited pattern characters and/or positions that influence the greatest average deviations (i.e., text search point jumps, Ts incrementations, etc.). In an embodiment, program 150 utilizes the characters with the greatest average deviations to set subsequent Ts for additional SRST instructions. For example, in a COBOL loop the text string is in a language with dissimilar character frequencies, such that it is probable that one or two characters in a pattern string are more probable than the remaining characters to account for a failure to match. In this example, after a few hundred calls and/or iterations, it is likely that one or more significant characters will be present in the data recorded/gathered.

Figure 6:
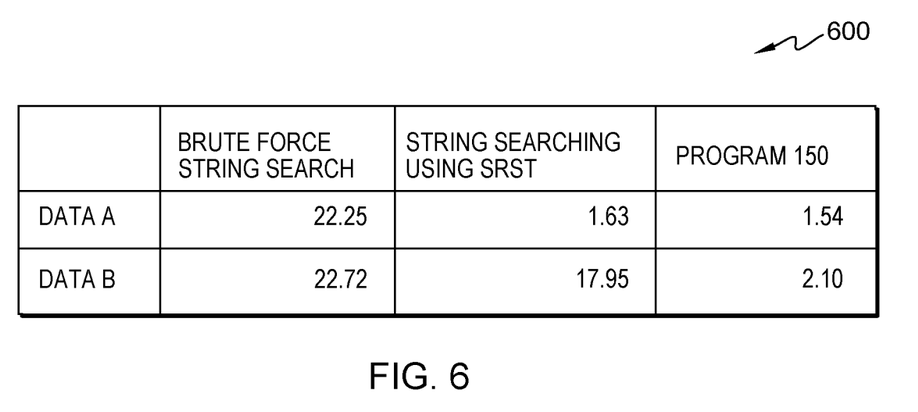
FIG. 6 is a table containing performance metrics associated with the operational steps of the program within the data processing environment of FIG. 1, in accordance with an embodiment of the present invention.

FIG. 6 depicts table 600 contained a plurality of performance metrics associated with the operational steps of FIG. 2, in accordance with an embodiment of the present invention. The table contains performance metrics derived from tests targeting fast character search routines, where performance metrics (i.e., search times) are measured in seconds taken to complete a string search and lower search times are preferred. The tests compare three search programs: brute force string search without SRST, string searching using SRST, and program 150, where each program 150 searches for a specific substring (i.e., pattern string) within a larger string (i.e., text string). The brute force string search without using SRST program utilizes the following steps: loop through each character position in the text string; for each position, compare the pattern string and the substring at that text string position; and repeat until a matching substring is found, or until the end of the text string (i.e., pattern string does not exist). The string searching using SRST program utilizes the following steps: take the first character in the pattern string; utilize SRST to locate the next position in the text string that contains a first character; compare strings to check if the substring in this position matches the pattern string; and repeat until a substring is found, or until the end of the text string. The aforementioned tested programs were tested with two sets of test data: Data A and Data B. Data B utilizes text strings that contain repeated occurrences of the first character of the pattern string. Table 600 demonstrates that when the first character of the pattern string is repeated a large number of times in the text string (i.e., Data B), string search using SRST performs poorly (i.e., 17.95 seconds) as compared to program 150 (i.e., 2.10 seconds) with the same data (i.e., Data B).

Figure 7:
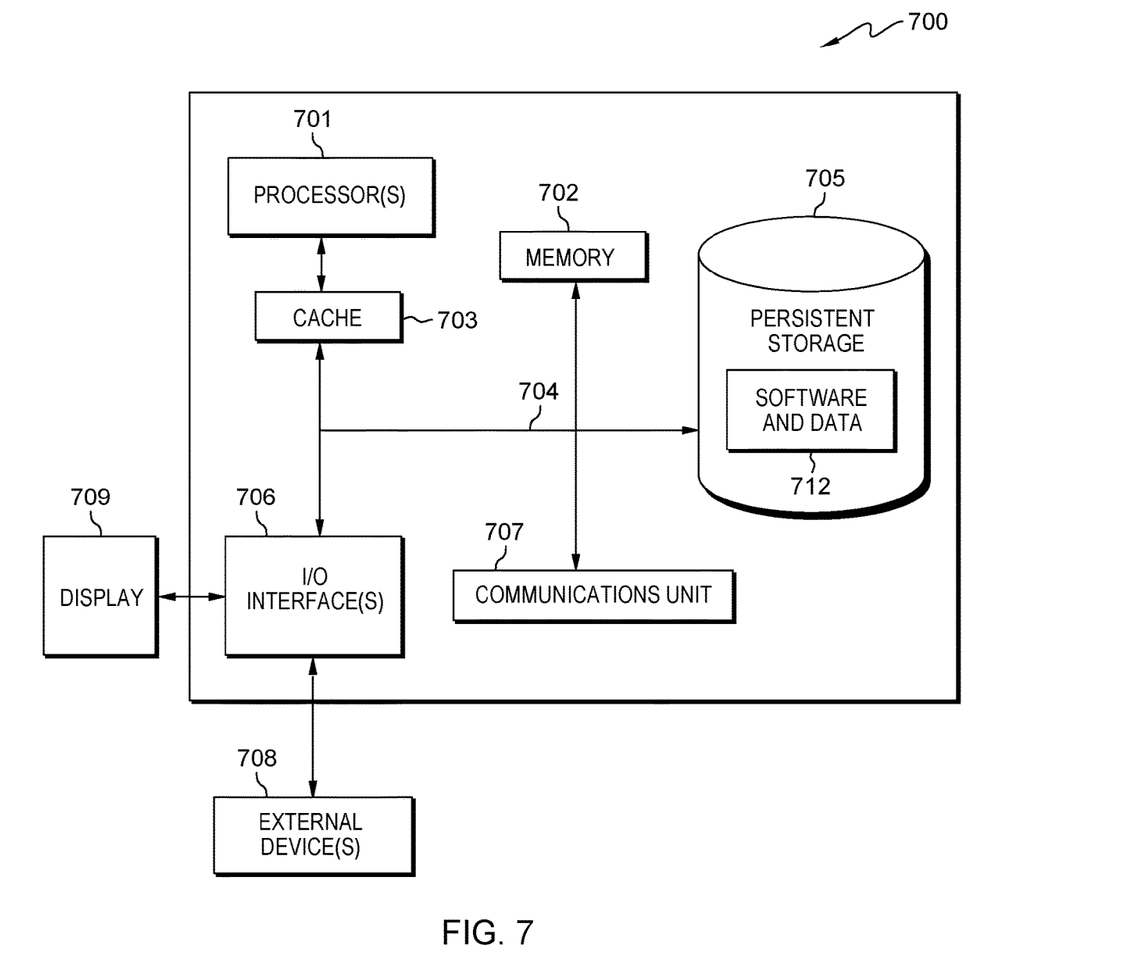
FIG. 7 is a block diagram of components of the server computer, in accordance with an embodiment of the present invention.

FIG. 7 depicts block diagram 700 illustrating components of server computer 120 in accordance with an illustrative embodiment of the present invention. It should be appreciated that FIG. 7 provides only an illustration of one implementation and does not imply any limitations with regard to the environments in which different embodiments may be implemented. Many modifications to the depicted environment may be made.

Server computer 120 includes communications fabric 704, which provides communications between cache 703, memory 702, persistent storage 705, communications unit 707, and input/output (I/O) interface(s) 706. Communications fabric 704 can be implemented with any architecture designed for passing data and/or control information between processors (such as microprocessors, communications, and network processors, etc.), system memory, peripheral devices, and any other hardware components within a system. For example, communications fabric 704 can be implemented with one or more buses or a crossbar switch.

Memory 702 and persistent storage 705 are computer readable storage media. In this embodiment, memory 702 includes random access memory (RAM). In general, memory 702 can include any suitable volatile or non-volatile computer readable storage media. Cache 703 is a fast memory that enhances the performance of computer processor(s) 701 by holding recently accessed data, and data near accessed data, from memory 702.

Program 150 may be stored in persistent storage 705 and in memory 702 for execution by one or more of the respective computer processor(s) 701 via cache 703. In an embodiment, persistent storage 705 includes a magnetic hard disk drive. Alternatively, or in addition to a magnetic hard disk drive, persistent storage 705 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 705 may also be removable. For example, a removable hard drive may be used for persistent storage 705. Other examples include optical and magnetic disks, thumb drives, and smart cards that are inserted into a drive for transfer onto another computer readable storage medium that is also part of persistent storage 705. Software and data 712 can be stored in persistent storage 705 for access and/or execution by one or more of the respective processors 701 via cache 703.

Communications unit 707, in these examples, provides for communications with other data processing systems or devices. In these examples, communications unit 707 includes one or more network interface cards. Communications unit 707 may provide communications through the use of either or both physical and wireless communications links. Program 150 may be downloaded to persistent storage 705 through communications unit 707.

I/O interface(s) 706 allows for input and output of data with other devices that may be connected to server computer 120. For example, I/O interface(s) 706 may provide a connection to external device(s) 708, such as a keyboard, a keypad, a touch screen, and/or some other suitable input device. External devices 708 can also include portable computer readable storage media such as, for example, thumb drives, portable optical or magnetic disks, and memory cards. Software and data used to practice embodiments of the present invention, e.g., program 150, can be stored on such portable computer readable storage media and can be loaded onto persistent storage 705 via I/O interface(s) 706. I/O interface(s) 706 also connect to a display 709.

Display 709 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, conventional procedural programming languages, such as the "C" programming language or similar programming languages, and quantum programming languages such as the "Q" programming language, Q #, quantum computation language (QCL) or similar programming languages, low-level programming languages, such as the assembly language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
   receiving, by one or more computer processors, a pattern string comprising a pointer to a pattern search point and a string comprising a pointer to a search point;
   determining, by one or more computer processors, a plausible search point within the string for the pattern character, further comprising:
      creating, by one or more computer processors, a table containing an entry for each pattern character in the pattern string, wherein the table includes a number of mismatches for each pattern character in the pattern string, an offset value calculated from an expected position of the pattern character in the string, a computed average mismatch offset for each character in the pattern string, and a corresponding pattern character position in the pattern string; and
      utilizing, by one or more computer processors, the respective average mismatch offset to assign the plausible search point with the string, wherein the average mismatch offset is a respective error value for each pattern character in the pattern string;
   executing, by one or more computer processors, a search string (SRST) instruction with the determined search point and the pattern character, wherein the SRST instruction returns an indication of whether the character corresponds to the pattern character, further comprising:
      rotating, by one or more computer processors, an order of character visitation such that at least one common character is matched from the string to the pattern string;
      responsive to determining that the pattern character is located within the string but not in a correct position as required by the pattern string based on the executed SRST instruction, computing, by one or more computer processors, the offset value comprising a difference between a first occurrence of the determined pattern character located within the pattern string but not in the correct position and a current pattern character position;
      executing, by one or more computer processors, a subsequent SRST instruction with the current pattern character position and the computed offset set as a new search point; and
   responsive to identifying all pattern characters in the correct position within the string based on the executed subsequent SRST instruction, transmitting, by one or more computer processors, a memory address associated with a substring comprised of the string and corresponding pattern characters in the correct position.

2. The computer-implemented method of claim 1, further comprising:
   producing, by one or more computer processors, an optimal visiting order of pattern characters by sorting the created table in descending order; and
   executing, by one or more computer processors, the subsequent SRST instruction utilizing the produced optimal visiting order of pattern characters.

3. The computer-implemented method of claim 1, wherein the string contains repeated occurrences of a first pattern character of the pattern string.

4. The computer-implemented method of claim 1, further comprising:
   responsive to an indication that a first pattern character in the pattern string does not exist in the string, notifying, by one or more computer processors, a failure of search.

5. The computer-implemented method of claim 1, wherein the search point and the pattern search point are memory addresses.

6. A computer program product comprising:
   one or more computer readable storage media and program instructions stored on the one or more computer readable storage media, the stored program instructions comprising:
   program instructions to receive a pattern string comprising a pointer to a pattern search point and a string comprising a pointer to a search point;
   program instructions to determine a plausible search point within the string for the pattern character, wherein the program instructions comprise:
      program instructions to create a table containing an entry for each pattern character in the pattern string, wherein the table includes a number of mismatches for each pattern character in the pattern string, an offset value calculated from an expected position of the pattern character in the string, a computed average mismatch offset for each character in the pattern string, and a corresponding pattern character position in the pattern string; and program instructions to utilize the respective average mismatch offset to assign the plausible search point with the string, wherein the average mismatch offset is a respective error value for each pattern character in the pattern string;

program instructions to execute a search string (SRST) instruction with the determined search point and the pattern character, wherein the SRST instruction returns an indication of whether the character corresponds to the pattern character, wherein the program instructions comprise:

program instructions to rotate an order of character visitation such that at least one common character is matched from the string to the pattern string;

program instructions to, responsive to determining that the pattern character is located within the string but not in a correct position as required by the pattern string based on the executed SRST instruction, compute the offset value comprising a difference between a first occurrence of the determined pattern character located within the pattern string but not in the correct position and a current pattern character position;

program instructions to execute a subsequent SRST instruction with the current pattern character position and the computed offset set as a new search point; and program instructions to, responsive to identifying all pattern characters in the correct position within the string based on the executed subsequent SRST instruction, transmit memory address associated with a substring comprised of the string and corresponding pattern characters in the correct position.

7. The computer program product of claim 6, wherein the program instructions, stored on the one or more computer readable storage media, further comprise:

program instructions to produce an optimal visiting order of pattern characters by sorting the created table in descending order; and program instructions to execute the subsequent SRST instruction utilizing the produced optimal visiting order of pattern characters.

8. The computer program product of claim 6, wherein the string contains repeated occurrences of a first pattern character of the pattern string.

9. The computer program product of claim 6, wherein the program instructions, stored on the one or more computer readable storage media, further comprise:

program instructions to responsive to an indication that a first pattern character in the pattern string does not exist in the string, notify a failure of search.

10. The computer program product of claim 6, wherein the search point and the pattern search point are memory addresses.

11. A computer system comprising: one or more computer processors;

one or more computer readable storage media; and program instructions stored on the computer readable storage media for execution by at least one of the one or more processors, the stored program instructions comprising:

program instructions to receive a pattern string comprising a pointer to a pattern search point and a string comprising a pointer to a search point;

program instructions to determine a plausible search point within the string for the pattern character, wherein the program instructions comprise:

program instructions to create a table containing an entry for each pattern character in the pattern string, wherein the table includes a number of mismatches for each pattern character in the pattern string, an offset value calculated from an expected position of the pattern character in the string, a computed average mismatch offset for each character in the pattern string, and a corresponding pattern character position in the pattern string; and program instructions to utilize the respective average mismatch offset to assign the plausible search point with the string, wherein the average mismatch offset is a respective error value for each pattern character in the pattern string;

program instructions to execute a search string (SRST) instruction with the determined search point and the pattern character, wherein the SRST instruction returns an indication of whether the character corresponds to the pattern character, wherein the program instructions comprise:

program instructions to rotate an order of character visitation such that at least one common character is matched from the string to the pattern string;

program instructions to, responsive to determining that the pattern character is located within the string but not in a correct position as required by the pattern string based on the executed SRST instruction, compute the offset value comprising a difference between a first occurrence of the determined pattern character located within the pattern string but not in the correct position and a current pattern character position;

program instructions to execute a subsequent SRST instruction with the current pattern character position and the computed offset set as a new search point; and program instructions to, responsive to identifying all pattern characters in the correct position within the string based on the executed subsequent SRST instruction, transmit memory address associated with a substring comprised of the string and corresponding pattern characters in the correct position.

12. The computer system of claim 11, wherein the program instructions, stored on the one or more computer readable storage media, further comprise:

program instructions to produce an optimal visiting order of pattern characters by sorting the created table in descending order; and program instructions to execute the subsequent SRST instruction utilizing the produced optimal visiting order of pattern characters.

13. The computer system of claim 11, wherein the string contains repeated occurrences of a first pattern character of the pattern string.

14. The computer system of claim 11, wherein the program instructions, stored on the one or more computer readable storage media, further comprise:

program instructions to responsive to an indication that a first pattern character in the pattern string does not exist in the string, notify a failure of search.

\* \* \* \* \*